(12) United States Patent
Banet et al.

(10) Patent No.: US 8,180,911 B2
(45) Date of Patent: May 15, 2012

(54) METHOD OF DISTRIBUTING REAL TIME DATA STREAMS ACROSS A MULTIMEDIA NETWORK AS WELL AS A MEDIATION DEVICE AND A MULTIMEDIA NETWORK THEREFORE

(75) Inventors: Franz-Josef Banet, Vaihingen (DE);
Markus Jenisch, Waiblingen (DE);
Nina Köstering, Stuttgart (DE);
Wolfgang Lautenschlager, Weissach-Flacht (DE)

(73) Assignee: Alcatel Lucent, Paris (FR)

( * ) Notice: Subject to any disclaimer, the term of this patent is extended or adjusted under 35 U.S.C. 154(b) by 1031 days.

(21) Appl. No.: 10/862,438

(22) Filed: Jun. 8, 2004

(65) Prior Publication Data
US 2005/0015812 A1    Jan. 20, 2005

(30) Foreign Application Priority Data
Jul. 18, 2003    (EP) .................................... 03291783

(51) Int. Cl.
G06F 15/16    (2006.01)
(52) U.S. Cl. ...................................................... 709/231
(58) Field of Classification Search .......... 709/230–237; 725/123
See application file for complete search history.

(56) References Cited

U.S. PATENT DOCUMENTS

| | | | | |
|---|---|---|---|---|
| 5,285,272 | A * | 2/1994 | Bradley et al. ................. | 725/115 |
| 7,212,729 | B2 * | 5/2007 | Nakajima et al. ............... | 386/83 |
| 7,529,263 | B1 * | 5/2009 | Sparrell et al. ................. | 370/437 |
| 2002/0023165 | A1 * | 2/2002 | Lahr .............................. | 709/231 |
| 2002/0059623 | A1 * | 5/2002 | Rodriguez et al. ............. | 725/91 |
| 2002/0143901 | A1 * | 10/2002 | Lupo et al. ..................... | 709/219 |
| 2003/0030751 | A1 * | 2/2003 | Lupulescu et al. ............ | 348/552 |
| 2004/0179509 | A1 * | 9/2004 | Lev et al. ....................... | 370/349 |

FOREIGN PATENT DOCUMENTS

| | | |
|---|---|---|
| WO | WO 98/56181 | 12/1998 |
| WO | WO 02/21835 A1 | 3/2002 |
| WO | WO 03/056830 * | 7/2003 |
| WO | WO 03/056830 A1 | 7/2003 |

* cited by examiner

*Primary Examiner* — Hussein Elchanti
*Assistant Examiner* — Maceeh Anwari
(74) *Attorney, Agent, or Firm* — Sughrue Mion, PLLC

(57) ABSTRACT

The invention relates to a method of distributing real time data streams across a multimedia network to receiving terminals, wherein a selected real time data streams is transmitted from a media server to a specific receiving terminals, wherein a mediation device is located between said media server and the receiving terminals, that a bi-directional communication with said media server is terminated at said media server for receiving data streams destined for the selected terminal and that said data streams are further forwarded to said selected terminal by means of a uni-directional communication protocol, and also a mediation device and a multimedia network therefore.

28 Claims, 2 Drawing Sheets

METHOD OF DISTRIBUTING REAL TIME DATA STREAMS ACROSS A MULTIMEDIA NETWORK AS WELL AS A MEDIATION DEVICE AND A MULTIMEDIA NETWORK THEREFORE

TECHNICAL FIELD

The invention relates to a method of distributing real time data streams across a method of distributing real time data streams across a multimedia network to receiving terminals, a mediation device for mediating a real time data streams between a media server and a selected download terminal and a multimedia network comprising a media server for downloading a selected real time data stream to a selected download terminal therefore. The invention is based on a priority application EP 03 291 783.3 which is hereby incorporated by reference.

BACKGROUND OF THE INVENTION

In the recent decades, television cable networks were built up in numerous countries. These television cable networks traditionally serve as uni-directional broadband distribution networks, wherein a certain number of different channels, each reserved for a specific television (or radio) signal, are provided. The television signals are distributed to a plurality of television terminals. The subscribers then might each select one certain program out of said programs by switching his terminal to a corresponding frequency.

In the last years, efforts have been made to realise dialog services within said networks, especially to offer so-called video-on-demand services. In those services, the subscribers may select specific videos to be received at a selected time. However, the provision of a return channel for enabling a bi-directional information exchange between a subscribers (cable TV) terminal and a video server requires a cost intensive upgrade of existing broadband distribution networks.

An alternative solution to the provision of a return channel within existing uni-directional networks (distribution networks) is to use an existing communication network different from the distribution network for the realisation of a backward channel. In a simple realisation, a subscriber manually connects to a video server by means of the public telephone network. In WO 98/24238, a more sophisticated solution is proposed to use the a public telephone network for realising a backward channel. Therefore, a television digital receiver or a so-called Set Top Box is provided with a wireless transmitter for transmitting backward commands via said telephone network to a video (data) server for selection of videos. The subscriber may select a video from a menu displayed on the television screen and inputs that choice by means of a subscriber interface of the Set Top Box. Said Set Top Box then automatically connects to the respective video server and transmits that choice via said mobile telephone network.

The internet is increasingly used for distribution of real time data streams. For this purpose, protocols like the real time protocol (RTP) proposed by the IETF and further control and signalling protocols have been developed. However, the access to the internet often only allows only for a very limited bit rate, that is not sufficient for the distribution of high quality real time media data.

It is an object of the invention to establish a method and corresponding devices allowing for high quality multimedia distribution multimedia servers using bi-directional communication protocols to receiving terminals connected to a uni-directional distribution network.

SUMMARY OF THE INVENTION

This object is achieved, according to the invention, by a method of distributing real time data streams across a multimedia network to receiving terminals, a mediation device for mediating a real time data streams between a media server and a selected download terminal and a multimedia network comprising a media server for downloading a selected real time data stream to a selected download terminal.

The basic idea of the invention is that, bi-directionality for media stream distribution from a media server to the receiving terminals is simulated by introducing a mediation device between said media server and said receiving terminals. The mediation device terminates the bi-directional real time communication to said media server and forwards the received media streams thereby received to the corresponding receiving terminal.

Further refinements of the invention are to be found in the dependent claims and in the description below.

BRIEF DESCRIPTION OF THE DRAWINGS

The invention is explained further below with the aid of the accompanying drawing:

Figure 1:
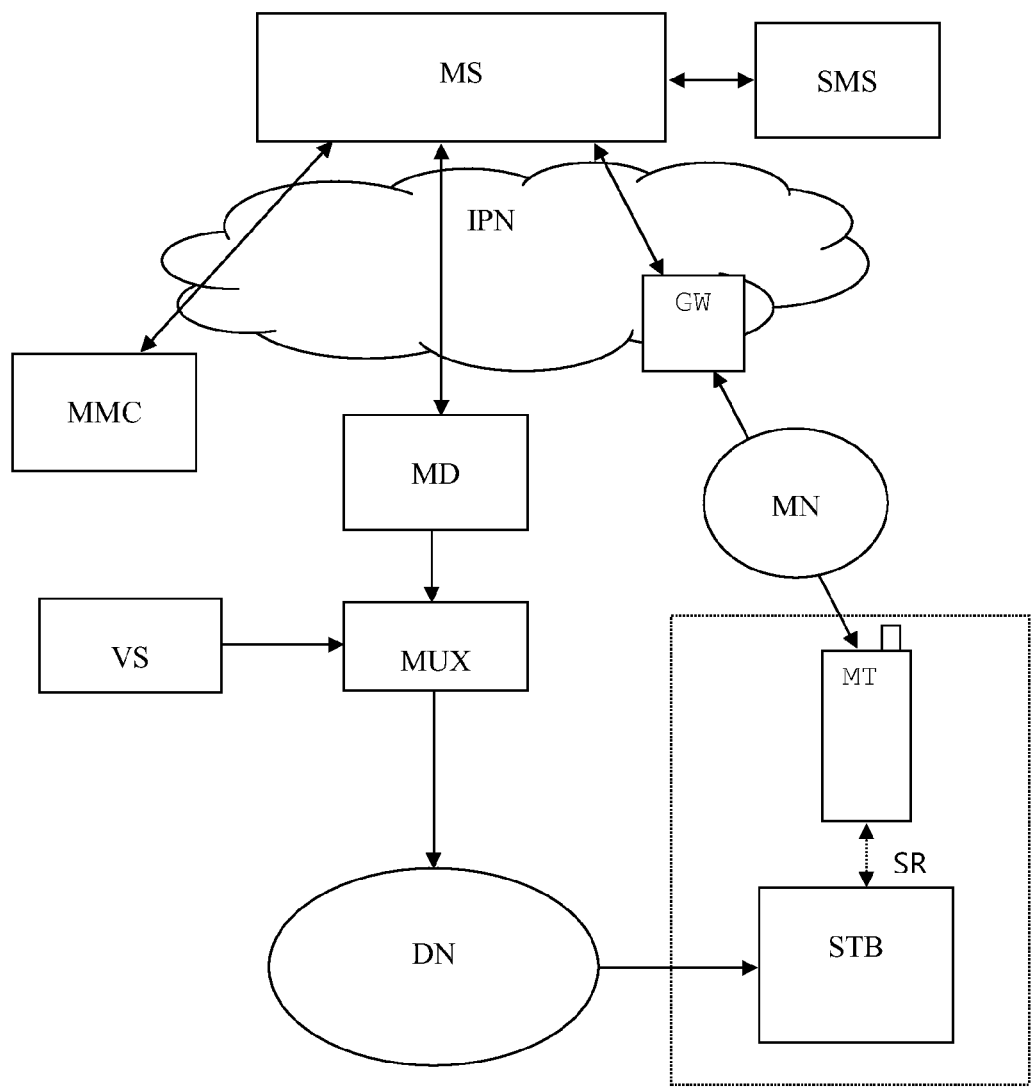
Figure 2:
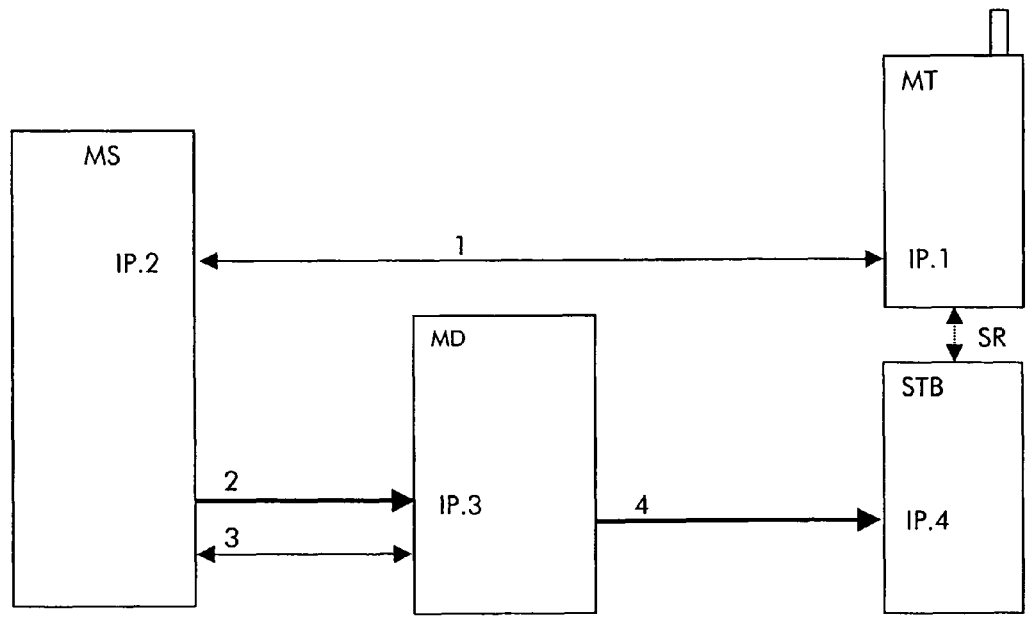
Figure 3:
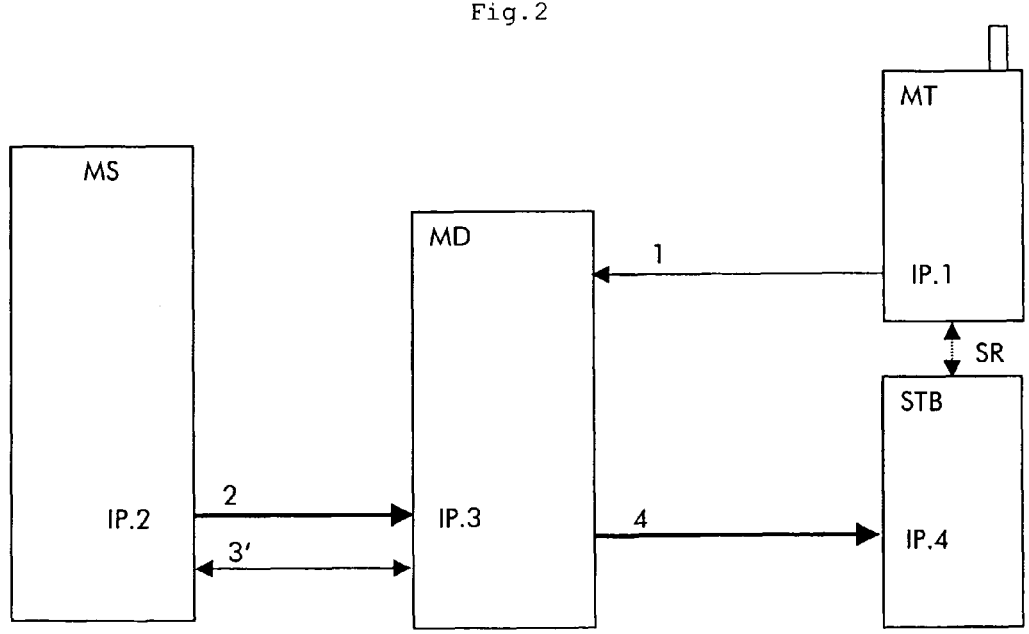

| | |
|---|---|
| FIG. 1 | shows a block diagram representing an exemplary multimedia network according to the invention with a mediation device according to the invention, |
| FIG. 2 | shows an exemplary communication protocol scheme used between said multimedia server, said mediation device and a subscribers terminal and |
| FIG. 3 | shows an alternative communication protocol scheme. |

DETAILED DESCRIPTION OF PREFERRED EMBODIMENTS

FIG. 1 shows a multimedia network MMN with a (multi-) media server MS, an Internet Protocol network IPN, further referred to as IP network, a subscriber management server SMS, a mediation device MD, media control centre MMC, a multiplexer MUX, a conventional video server VD, a video distribution network DN, a media gateway GW and a mobile network MN. Further, a (multimedia) download terminal or set top box STB and a mobile terminal MT associated in one exemplary home area HA are shown. Connections with bi-directional communications relations are represented by double arrows between the related communication devices, further referred to as bi-directional connections, and uni-directional communication relations are represented by single arrows each in the direction of the information flow, further referred to as uni-directional connections.

The mobile terminal MT shows a bi-directional connection over the mobile network MN to the gateway GW, that further shows a bi-directional connection over the IP network to the media server MS. The media server MS shoes a bi-directional connection each to the mediation device MD and to the media control centre MMC. The mediation device MD as well as the conventional video server VS each show a uni-directional connection in direction to the multiplex MUX. The multiplexer MUX shows a uni-directional connection to the video distribution network DN, that is further connected to the one exemplary home area HA. The multiplexer MUX shows a uni-directional connection in direction to the mobile terminal MT of the one exemplary home area HA. The mobile terminal MT and the download terminal STB have a bi-directional short range connection SR.

In the following, an exemplary sequence of actions for selecting a (media stream) program and distributing this program:

First, the mobile terminal MT connects to the media server MS for requesting a selection menu. The gateway GW allows for a protocol translation between the mobile network MN and the IP network IPN. By way of example, the mobile terminal MT is a GSM (abbreviation for Global System for Mobile Communication) terminal, enhanced with the so-called General Packet Radio Service (GPRS), that enables an always-on connections and data packet exchange. Moreover, the GSM/GPRS enables services such as internet browsing, e-mail and powerful visual communications. On the application level the mobile terminal MT communicates with the media server MS e.g. by means of the so-called http (=hypertext transfer protocol); therefore the mobile terminal may comprises a so-called java MIDlet and the media server MS comprises a so-called java applet. These software packets allow for the creation and visualisation of HTML (=hyper text markup language) or XML (extensible markup language) documents.

Selecting a Program:

The mobile terminal MT requests a program service provided by the media server MS. Preferably, in advance to any service provision, the authentication and authorisation of the subscriber using said mobile terminal MT is carried out. The authentication and identification can be performed by existing mechanisms used for mobile terminals by means of the so-called subscriber identification module (SIM) inserted into the mobile terminal. To avoid any unauthorised use of the mobile terminal MT by a non authorised user, input of a separate password might be requested. Further, a check might be performed about the account of the subscriber. If the subscriber is identified and authorised, further service information, e.g. in form of a program menu, is send to the subscribers mobile terminal MT, who that may request a specific multimedia service, e.g. a program, the start date and time and a certain quality of service.

Alternatively, the program menu is downloaded to the download terminal. The menu there can be displayed on the big display of the download terminal STB. There, available programs (videos) and/or services can be displayed in greater details. Further each program or service is assigned with a specific number or symbol. For selecting a program or service, the user might input the corresponding number into his mobile terminal MT or press a soft key (representing a symbol). The mobile terminal MT transmits this information to the network MN. The same mechanism can be used for requesting additional information. The mobile terminal MT thus can be used like a remote control device of a conventional TV set.

Preferably, for each subscriber an account is managed within the network. These accounts might be charged on a regularly base (subscriber fee) and/or on a pay per view base. Authentication, authorisation and accounting is preferably performed by the media control centre MMC. The media control centre MMC can consist of a separate server, that communicates with the media server MS and possibly with the mediation device MD across the IP network IPN. Alternatively, some or all of said units MD, MS MMC and the media gateway GW can be integrated into one hardware unit.

After a successful selection of a program, at the starting time the media server MS establishes a connection to the mediation device MD. The mediation device MD terminates the bi-directional media stream protocol with the media server MS, translates the media stream content for a uni-directional distribution over the distribution network DN to a selected set top box associated to the mobile terminal MT. Before distribution, the digital media stream by way of example is multiplexed with further media streams of a conventional video server VS.

Choice of the Download Terminal:

In the most simple variant, the mobile terminal MT is just associated to a fix selected set top box STB of the same user. For this case, a fix mapping of mobile terminal users and download terminal addresses is stored in a data base e.g. of the media control centre MMC.

In a preferred embodiment, the mobile terminal MT user might each time using the service freely select one ore more download terminals STB, that should receive a selected program. Therefore, the user manually enters the network address of the selected download terminal STB into his mobile terminal M, that further transmits this address to the multimedia network MMN. The mediation device MD then routes the selected program to the suchlike selected terminal. Thus, it is possible e.g. to select a terminal of a hotel as download terminal.

To avoid cumbersome manual input of the selected download terminal, even if normally only the home terminal is used, said home terminal or the last selected terminal can be chosen as default terminal, when initiating a new service session.

In an advantageous further embodiment, the mobile terminal MT connects via a short range interface, e.g. via a so-called bluetooth interface or an infrared interface, with the selected download terminal STB, requesting and receiving its address. Said mobile terminal MT then automatically transmits the address to the multimedia network, wherein the mediation device MD is informed for routing the selected program to the suchlike selected terminal.

Electronic Key Exchange:

In practise, the chosen program or media stream respectively, cannot be downloaded to just only the selected terminal STB, but has to be physically downloaded to all terminals STB connected to a certain distribution node of the distribution network DN. The media stream selected by one of the users is broadcasted e.g. on a defined digital channel to a certain group of terminals STB. To avoid, that the media stream data can be visualised on any other than the selected terminal(s) STB, said data is encrypted by the media server MS or by the mediation device MD. A decryption of said data is only possible by the terminal STB of the corresponding authorised user. For encryption and decryption, e.g. a symmetric key can be used. This means that the encryption key and the decryption key are similar, i.e. the same mathematical operation is carried out over the information to be encrypted and the encrypted information to be decrypted. Also other electronic key systems might be used, e.g. a so-called asymmetric key system not further discussed here. In the following, only symmetric keys are discussed.

In the simplest case, each subscriber has a fixed electronic key stored in his download terminal STB. Correspondingly, a fixed mapping of electronic keys and subscriber identifications (e.g. mobile terminal addresses) is stored in the network MMN. In this case no distribution policy is necessary.

In a more sophisticated embodiment, electronic keys can be assigned dynamically. This allows any user to freely select a download terminal. However, if a new choice is performed, a key for decryption needs to be transmitted to the selected terminal.

One possible solution is, that the key, stored in the mobile terminal MT or sent via the mobile network MN to the mobile terminal MT, is to be entered manually or transmitted by the short range communication interface SR to the download terminal STB.

A alternative solution of a key exchange procedure consist in directly transmitting a new electronic key from the network MMN to the selected download terminal STB, wherein said new electronic key is encrypted with the old electronic key or an initial electronic key, that is (still) stored in the download terminal STB. The download terminal STB and only said terminal is able to decode this new key and store it as actual key e.g. replacing the old key.

In yet a further alternative solution, the network MMN distributes an electronic key previous to each session, that is only valid for this session. The encryption of this session key is carried out by a permanent initial or basic key specific for each download terminal stored in the download terminal STB. The media control centre MMC initiates the transmission of the new key to the selected download terminal encrypted by the corresponding initial key stored within a data base accessible by said control centre.

Remote Control:

The Java MIDlet loaded into the mobile terminal MT and the corresponding Java servlet running in the Gateway GW are designed such, that a user is able to control the download of multimedia data in real time. The mobile terminal serves as a remote control allowing e.g. for playing, stopping fast forwarding, fast reversing the received video film.

FIG. 2 shows an exemplary and communication protocol scheme used between said media server MS, said mediation device MD and the users terminals MT and STB.

FIG. 2 exemplary shows the media server MS, the mediation device MD the mobile terminal MT and the download terminal STB known from FIG. 1. The mobile terminal MT has by way of example an internet protocol address IP.1, the media server MT has by way of example an internet protocol address IP.2, the mediation device has by way of example an internet protocol address IP.3 and the download terminal STB has by way of example an internet address IP4. Said addresses IP.1-IP.4 can alternatively constitute network addresses of any other network different from an IP network.

A first bi-directional protocol 1 is carried out between the mobile terminal MT and the media server MS, a second uni-directional protocol 2 and a third bi-directional protocol are carried out between the media server MS and the mediation device MD, and a fourth uni-directional protocol 4 is carried out between the mediation device MD and the download terminal STB.

The first protocol 1 serves for control communication, i.e. for the above described authorisation authentication service selection and real time control. This protocol information e.g. is carried over a RTSP/UDP/IP protocol suite:

The UDP (User Datagram Protocol) transport layer protocol provides a connectionless unreliable datagram service on top of the internet protocol IP.

The RTSP (Real Time Streaming Protocol) is an application-level protocol on top of the UDP and IP. This protocol aims to provide an extensible framework to enable controlled delivery of real-time data, such as audio and video. Sources of data can include both live data feeds, such live audio and video, and stored content, such as pre-recorded events. It is designed to work with established protocols such as RTP, HTTP, and others to provide a complete solution for streaming media over the Internet. It supports multicast as well as unicast. It also supports interoperability between clients and servers from different vendors.

The second protocol 2 serves for downloading media data or data streams from the media server MS to the mediation device MD, that terminates said data stream. This data is e.g. by an RTP/UDP/IP protocol suite:

To use the UDP as a transport protocol for real-time traffic, some functionality has to be added. This functionality is provided by the so-called real time transport protocol (RTP), that is a protocol in context with the Internet protocol suite providing support for applications with real-time properties, including timing reconstruction, loss detection, security and content identification. The real-time transport protocol. RTP is defined in the proposal numbered RFC 1889 of the internet engineering task force (IETF).

The third protocol 3 serves for controlling the download of the data stream carried by the second protocol 2. This data is e.g. by an RTCP/UDP/IP protocol suite:

The RTCP (real time control protocol) is the control protocol that works in conjunction with RTP. It provides support for real-time conferencing within an internet. It is defined in the proposals numbered RFC 1889 and RFC 1890 of the internet engineering task force.

RTCP control packets are periodically transmitted by each participant in an RTP session to all other participants. The primary function is to provide feedback information to an application regarding the quality of data distribution. Therefore, each RTCP packet contains sender and/or receiver reports comprising statistics useful to the application. These statistics include number of packets sent, number of packets lost and inter arrival jitter.

The fourth protocol 4 serves for forwarding the media data carried by the second protocol 2 to the download terminal STB under the address IP.4. The fourth protocol 4 can be a one of existing digital distribution protocol used by existing cable TV distribution networks, e.g. the so-called ASI (Asynchronous Serial Interface) protocol.

Alternatively, this protocol can be an RTP/UDP/IP protocol suite similar to the second protocol 2.

FIG. 3 by way of example, shows an alternative communication protocol scheme. FIG. 3 is similar to FIG. 2 except in, that, there is no direct protocol link between the mobile terminal MT and the media server MS, but a similar protocol link 1 between the mobile terminal MT and the mediation device MD. Here, the mediation device MD takes over the control of the communication relations between the mobile terminal MT and the receiving terminal(s) STB.

The mediation device MD contains or has access to a data base of terminal addresses. The mediation device MD, after user authentication and authorisation, mobile terminal MT and receiving terminal STB identification and program selection, advises the media server MS to send the media stream of the selected program (at a selected date and time) to the mediation device MD. The further distribution is similar to the distribution explained under FIG. 2.

Normally, an unambiguous address relation must exist between a client and a server. For bi-directional media communication, conventionally bi-directional connections between client and server are necessary. Moreover, if different networks are used for upload and download and thus different terminals are necessary on clients side as shown in the above example, both terminals need to have each an own network address. In the widely used Internet Protocol Version 4, abbreviated IPv4, the number of available addresses are limited; fixed addresses cannot be assigned to the home terminals.

To avoid the assignment of fixed addresses or any cumbersome manual input of addresses into the mobile terminal MT, in each distribution network (e.g. internet or television network) segment or sub network, network addresses of said server and terminals are related in a fixed way using locally valid addresses, that can be re-used in other physically distinct segments.

In a further embodiment of the invention, the mediation device MD assigns said locally valid addresses to subscribers names proposed in the following exemplary structure:
name.service-type.provider.country
Exemplary, for the subscriber F. J. Banet, subscribing to a service provided by the company identified by "KBW" in Germany an address could have a following format:
FJBANET.IPTV.KBW.DE

The invention claimed is:

1. A method of distributing real time data streams across a multimedia network to receiving terminals, wherein a real time data stream is transmitted from a media server to a receiving terminal at an end of a subscriber of the real time data stream,
   wherein a mediation device is located in between the media server and the receiving terminal,
   wherein a bi-directional communication between the media server and the mediation device is terminated at the mediation device for receiving the real time data stream destined for the receiving terminal,
   wherein the real time data stream is further forwarded from the mediation device to the receiving terminal via a uni-directional distribution network by means of a uni-directional communication protocol,
   wherein a bi-directional communication is not supported in the uni-directional distribution network,
   wherein quality control of the transmission of the real time data stream from the media server to the receiving terminal via the uni-directional communication network is performed in the mediation device at least by means of controlling the bi-directional communication, and
   wherein the real time data stream comprises a multimedia data stream comprising audio and video data,
   wherein control information is transmitted from a telephone terminal associated with the receiving terminal to the media server or the mediation device for controlling the transmission of the real time data stream from the media server to the receiving terminal, and
   wherein an address of the receiving terminal is determined by carrying out the following steps:
   the telephone terminal receiving the address of the receiving terminal by means of a short range communication between the receiving terminal and the telephone terminal; and
   the telephone terminal passing the address to the multimedia network.

2. A method according to claim 1, wherein the telephone terminal transmits a signal requesting the receiving terminal to transmit an identity of the receiving terminal to the telephone terminal, receives a signal including the identity of the receiving terminal from the receiving terminal, and informs the media server or the mediation device of the identity of the receiving terminal so that the real time data stream is transmitted to the receiving terminal based on the identity of the receiving terminal.

3. A method according to claim 2, wherein the real time data stream is encrypted within the network before sent to the receiving terminal, and
   wherein after the authentication and authorisation passes, the telephone terminal receives an electronic key for decryption of the real time data stream from the media server or the mediation device, and transmits the electronic key to the receiving terminal.

4. A method according to claim 2, wherein billing to the subscriber is performed after identification of the subscriber and according to a selected service.

5. A method according to claim 1, wherein a mapping of the address of the receiving terminal and an identity of the subscriber of the real time data stream is stored in the multimedia network,
   wherein the receiving terminal is determined by identifying the subscriber and retrieving the address of the receiving terminal by looking up the mapping.

6. A method according to claim 1, wherein the receiving terminal is not allowed to send a request for the real time data stream through the uni-directional distribution network connecting the mediation device and the receiving terminal based on the uni-directional communication protocol.

7. A method according to claim 1, the uni-directional communication protocol comprises an Asynchronous Serial Interface protocol.

8. A method according to claim 1, wherein the telephone terminal is a wireless terminal.

9. A method according to claim 1, wherein the receiving terminal is a set-top box that converts the real time data stream for display in a display unit, or a corresponding unit that is contained in the display unit and converts the real time data stream for display in the display unit,
   wherein the telephone terminal requests information on the real time data stream from the media server before the real time data stream is forwarded to the receiving terminal, and the information is sent to the receiving terminal in response to the request of the telephone terminal, and
   wherein the information sent to the receiving terminal is used by the subscriber of the real time data stream to control the transmission of the real time data stream from the media server to the receiving terminal by sending control information to the media server or the mediation device using the telephone terminal.

10. A method according to claim 1, wherein the telephone terminal is a mobile terminal,
    wherein the mobile terminal requests information on the real time data stream from the media server before the real time data stream is forwarded to the receiving terminal, and the information is sent to the receiving terminal in response to the request of the mobile terminal, and
    wherein the information sent to the receiving terminal is used by the subscriber of the real time data stream to control the transmission of the real time data stream from the media server to the receiving terminal by sending the control information to the media server or the mediation device using the mobile terminal.

11. A method according to claim 10, wherein the information sent to the receiving terminal comprises menu information for selecting the real time data stream and time information on the real time data stream.

12. The method according to claim 1, wherein the mediation device is connected to the media server through the Internet by using the Internet protocol (IP), and the controlling the bi-directional communication for the quality control is performed through the Internet.

13. The method according to claim 12, wherein the uni-directional communication protocol comprises an Asynchronous Serial Interface protocol, and wherein the bi-directional communication with the media server terminated at the mediation device is performed by using at least one of the Internet protocol (IP), a real time control protocol (RTCP) and a real time protocol (RTP) defined by the Internet Engineering Task Force (IETF).

14. The method according to claim 1, wherein the telephone terminal controls operation of the receiving terminal, and
wherein the operation comprises at least one of playing, stopping, fast forwarding and fast reversing of the real time data stream.

15. A mediation device for mediating real time data streams between a media server and a receiving terminal at an end of a subscriber of the real time data stream, wherein the mediation device comprises:
a unit which terminates a bi-directional communication with the media server for receiving a real time data stream destined for the receiving terminal; and
a unit which further transmits the real time data stream to the receiving terminal via a uni-directional distribution network by means of a uni-directional communication protocol,
wherein a bi-directional communication is not supported in the uni-directional distribution network,
wherein quality control of the transmission of the real time data stream from the media server to the receiving terminal via the uni-directional communication network is performed in the mediation device at least by means of controlling the bi-directional communication, and
wherein the real time data stream comprises a multimedia data stream comprising audio and video data,
wherein control information is transmitted from a telephone terminal associated with the receiving terminal to the media server or the mediation device for controlling the transmission of the real time data stream from the media server to the receiving terminal, and
wherein the telephone terminal receives an address of the receiving terminal by means of a short range communication between the receiving terminal and the telephone terminal, and the telephone terminal passes the address to the media server or the mediation device.

16. A mediation device according to claim 15, wherein the receiving terminal is not allowed to send a request for the real time data stream to the mediation device through the uni-directional distribution network connecting the mediation device and the receiving terminal based on the uni-directional communication protocol.

17. A mediation device according to claim 15, wherein the receiving terminal is a set-top box that converts the real time data stream for display in a display unit, or a corresponding unit that is contained in the display unit and converts the real time data stream for display in the display unit,
wherein the telephone terminal requests information on the real time data stream from the media server before the real time data stream is forwarded to the receiving terminal, and the information is sent to the receiving terminal in response to the request of the telephone terminal, and
wherein the information sent to the receiving terminal is used by the subscriber of the real time data stream to control the transmission of the real time data stream from the media server to the receiving terminal by sending control information to the media server or the mediation device using the telephone terminal.

18. The mediation device according to claim 15, wherein the unit which terminates the bi-directional communication with the media server is connected to the media server through the Internet by using an Internet protocol (IP), and the controlling the bi-directional communication for the quality control is performed through the Internet.

19. The mediation device according to claim 18, wherein the uni-directional communication protocol comprises an Asynchronous Serial Interface protocol, and
wherein the bi-directional communication with the media server terminated at the mediation device is performed by using at least one of the Internet protocol (IP), a real time control protocol (RTCP) and a real time protocol (RTP) defined by the Internet Engineering Task Force (IETF).

20. The mediation device according to claim 15,
wherein the telephone terminal transmits a signal requesting the receiving terminal to transmit an identity of the receiving terminal to the telephone terminal, receives a signal including the identity of the receiving terminal from the receiving terminal, and informs the media server or the mediation device of the identity of the receiving terminal so that the real time data stream is transmitted to the receiving terminal based on the identity of the receiving terminal.

21. The mediation device according to claim 15, wherein the telephone terminal controls operation of the receiving terminal, and
wherein the operation comprises at least one of playing, stopping, fast forwarding and fast reversing of the real time data stream.

22. A multimedia network comprising:
a media server that stores a real time data stream;
a receiving terminal that is disposed at an end of a subscriber of the real time data stream, and downloads the real time data stream; and
a mediation device comprising:
a unit which terminates a bi-directional communication with the media server for receiving the real time data stream destined for the receiving terminal; and
a unit which further transmits the real time data stream to the receiving terminal via a uni-directional distribution network by means of a uni-directional communication protocol,
wherein a bi-directional communication is not supported in the uni-directional distribution network,
wherein quality control of the transmission of the real time data stream from the media server to the receiving terminal via the uni-directional communication network is performed in the mediation device at least by means of controlling the bi-directional communication, and
wherein the real time data stream comprises a multimedia data stream comprising audio and video data,
wherein control information is transmitted from a telephone terminal associated with the receiving terminal to the media server or the mediation device for controlling the transmission of the real time data stream from the media server to the receiving terminal, and
wherein the telephone terminal receives an address of the receiving terminal by means of a short range communication between the receiving terminal and the telephone terminal, and the telephone terminal passes the address to the media server or the mediation device.

23. The multimedia network according to claim 22, wherein the receiving terminal is not allowed to send a request for the real time data stream to the mediation device through the uni-directional distribution network connecting the mediation device and the receiving terminal based on the uni-directional communication protocol.

24. A multimedia network according to claim 22, wherein the receiving terminal is a set-top box that converts the real time data stream for display in a display unit, or a corresponding unit that is contained in the display unit and converts the real time data stream for display in the display unit,
   wherein the telephone terminal requests information on the real time data stream from the media server before the real time data stream is forwarded to the receiving terminal, and the information is sent to the receiving terminal in response to the request of the telephone terminal, and
   wherein the information sent to the receiving terminal is used by the subscriber of the real time data stream to control the transmission of the real time data stream from the media server to the receiving terminal by sending control information to the media server or the mediation device using the telephone terminal.

25. The multimedia network according to claim 22, wherein the unit which terminates the bi-directional communication with the media server is connected to the media server through the Internet by using an Internet protocol (IP), and the controlling the bi-directional communication for the quality control is performed through the Internet.

26. The multimedia network according to claim 25, wherein the uni-directional communication protocol comprises an Asynchronous Serial Interface protocol, and wherein the bi-directional communication with the media server terminated at the mediation device is performed by using at least one of the Internet protocol (IP), a real time control protocol (RTCP) and a real time protocol (RTP) defined by the Internet Engineering Task Force (IETF).

27. The multimedia network according to claim 22,
wherein the telephone terminal transmits a signal requesting the receiving terminal to transmit an identity of the receiving terminal to the telephone terminal, receives a signal including the identity of the receiving terminal from the receiving terminal, and informs the media server or the mediation device of the identity of the receiving terminal so that the real time data stream is transmitted to the receiving terminal based on the identity of the receiving terminal.

28. The multimedia network according to claim 22,
wherein the telephone terminal controls operation of the receiving terminal, and
wherein the operation comprises at least one of playing, stopping, fast forwarding and fast reversing of the real time data stream.

* * * * *